United States Patent [19]
Miles et al.

[11] Patent Number: 5,527,550
[45] Date of Patent: Jun. 18, 1996

[54] EGG YOLK EXTRACTING METHOD

[76] Inventors: Stanley K. Miles, 4319 Green Valley Rd., Suisun, Calif. 94585; Daniel B. Walker, 1689 Chateau Dr., Olivehurst, Calif. 95961

[21] Appl. No.: 217,460

[22] Filed: Mar. 24, 1994

[51] Int. Cl.$^6$ .............................. A23L 1/015; A23L 1/32
[52] U.S. Cl. .................... 426/478; 426/490; 426/614
[58] Field of Search .................. 426/614, 478, 426/298, 299, 490

[56] References Cited

U.S. PATENT DOCUMENTS 4,469,047  9/1984  Miller .......................................... 119/1

OTHER PUBLICATIONS

Caba Abstract Published 1979 for Veterinaniya Article (1978 No. 8) AN 79:103620 Caba B. Natenzon (author).

*Primary Examiner*—Anthony J. Weier
*Attorney, Agent, or Firm*—Thomas M. Freiburger

[57] ABSTRACT

An egg yolk extractor device and method removes up to about 90% of the yolk of an egg in such a way that the remaining yolk and white each retain their integrity and appearance when removed from the extractor device. A freshly cracked egg is placed onto the extractor with the yolk in a central area which generally confines the yolk but lets the white migrate outwardly. Vacuum is applied beneath the yolk via a small hole which breaks the yolk membrane and draws out most of the yolk but tends to retain the membrane together such that the remaining yolk retains its integrity in the membrane.

5 Claims, 4 Drawing Sheets

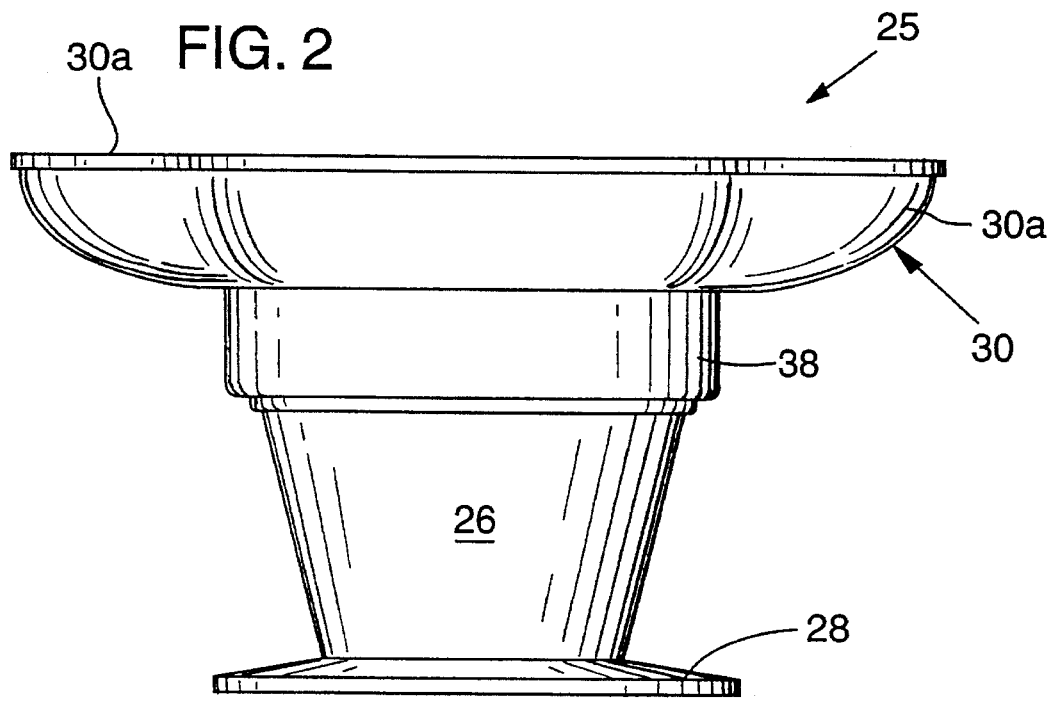
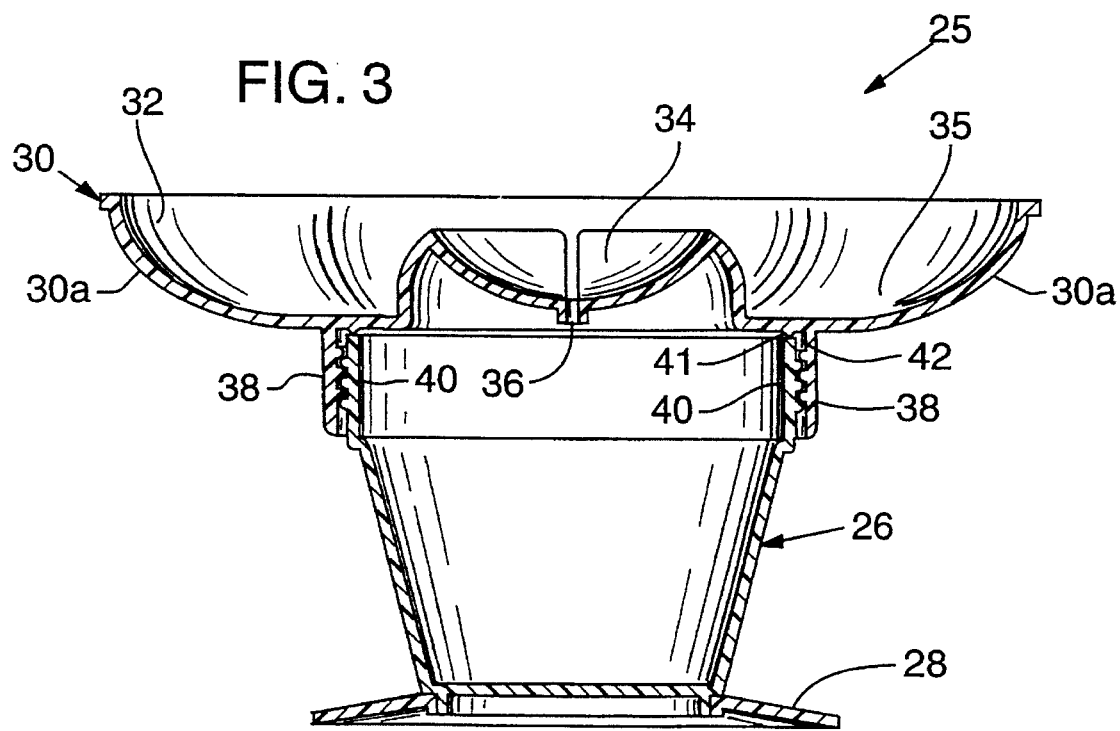

EGG YOLK EXTRACTING METHOD

BACKGROUND OF THE INVENTION

The invention relates to food processing equipment and methods. More specifically the invention is concerned with a relatively simple device and process for drawing most of the yolk out of an egg which has been removed from the shell, without destroying the appearance and integrity of the egg for cooking, for human consumption.

Hens' eggs contain animal fat and cholesterol and it has been determined that too much egg consumption can be deleterious to the cardiovascular systems of human beings. The yolk of the egg is where these potentially harmful substances lie, and therefore efforts have been made to remove some or all of the yolk from eggs, egg preparations and dried egg products. However, all known processes for yolk extraction have destroyed the appearance and integrity of the raw egg, so that a "sunny side up" or similar egg dish could not be achieved after removal of some of the yolk.

Like other eggs, the hen's egg has a membrane surrounding the yolk and separating the yolk from the white, which is transparent in the raw egg. The viscous white material seems to stick to this membrane, allowing the fresh egg to stay together, with yolk at center, when removed from the shell and transferred into a pan or onto another surface.

The applicant's own experimentation has shown that most attempts to extract part of an egg's yolk from a raw whole egg lying in a dish are not successful. The rupture of the yolk membrane normally tears open the membrane to an extent that the yolk runs and loses its shape. Until the present invention, no process or device has been known which is capable of removing most of the yolk of a hen's egg, leaving a small portion of the yolk, without destroying the separate integrities of the yolk and white and the appearance of the egg, for allowing preparation of dishes that depend on these qualities of the egg.

SUMMARY OF THE INVENTION

The invention described herein is capable of extracting most of the yolk of a hen's egg while maintaining the integrity of the white and remaining yolk.

The egg yolk extractor device and method of the invention remove as much of the yolk of an egg as desired, up to about 90% of the yolk, in such a way that the remaining yolk and white each retain their integrity and appearance. The user can thus greatly reduce the quantity of fat and cholesterol to be consumed. A freshly cracked egg is placed onto the extractor with the yolk in a central area and the white tending to migrate outwardly. Vacuum is applied to the yolk by a suction device to breach the yolk membrane in a small area and withdraw yolk material. This is preferably done by providing a small hole in the surface beneath the yolk, which breaks the yolk membrane only very locally and tends to retain the membrane together such that the remaining yolk remains held together in the membrane.

In one preferred embodiment of the invention the extractor device can be used to withdraw a metered quantity of the yolk from the egg as desired by the user.

It has been found that the yolk material can be withdrawn from the raw egg, without disturbing the integrity of the yolk-diminished egg, by a wide variety of arrangements, so long as a small aperture is put in contact with the yolk membrane and suction is applied. In this way the yolk membrane is fractured only at the location of the aperture, and the yolk is drawn out through the aperture, this process seemingly allowing the membrane fracture to repair or gather together to the extent that the egg yolk/white separation remains. This may be achieved even with a hypodermic needle which actually punctures through the yolk membrane to draw out the yolk material. However, it is preferable that some form of surface be pressed against the yolk membrane with a slight degree of pressure, the yolk withdrawing aperture being in that surface. Thus, in the preferred embodiment, the aperture can be formed in a surface on which the egg rests, thus pressing part of the weight of the yolk down against the aperture, or the aperture can be formed in a closure lid or other surface which is separate from the egg supporting surface and which is placed into contact with the surface of the yolk, i.e. the yolk membrane.

It is therefore among the objects of the invention to provide a device and a procedure for removing a portion of and potentially nearly all of the yolk of a freshly cracked egg, without destroying the integrity of the egg or the aesthetic appearance of the egg and white, such as for use in preparing certain egg dishes. These and other objects, advantages and features of the invention will be apparent from the following description of a preferred embodiment, considered along with the accompanying drawings.

DESCRIPTION OF THE DRAWINGS

FIG. 2 is a end elevation view showing one embodiment of a yolk extractor device embodying the invention and the principles illustrated in FIG. 1.

FIG. 3 is a sectional end elevation view of the yolk extractor device of FIG. 2.

DESCRIPTION OF PREFERRED EMBODIMENTS

Figure 1:
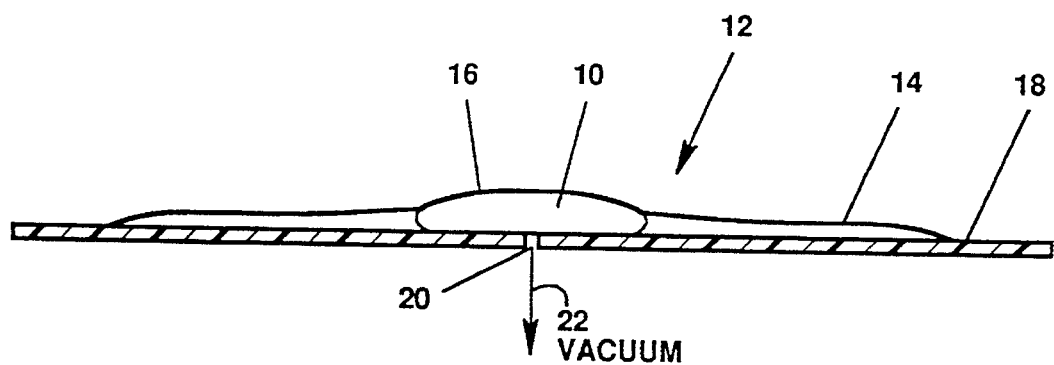
FIG. 1 is a conceptual or schematic view illustrating the principles of the method and apparatus of the invention, for removing a portion of the yolk of a raw whole egg.

FIG. 1 shows schematically the principle of yolk extraction in accordance with the invention, for withdrawing part and up to nearly all of the yolk 10 of a freshly cracked egg 12 from which the shell has been removed. The white of egg is shown at 14, and a yolk membrane which generally contains the egg yolk 10 is shown as a line 16 circumscribing the yolk 10 from all sides.

FIG. 1, in illustrating the concept of the invention, simply shows the fresh whole egg 12 resting on a surface 18, flat in this illustration. In a more preferred embodiment some form of depression or containment structure preferably is provided for generally containing the yolk in a central area of the extracting device.

FIG. 1 shows an aperture 20 through the surface 18, positioned below the yolk 10. This aperture is used, as indicated by the arrow 22, for applying suction to the surface of the yolk membrane, to thereby rupture the surface only in a small area essentially the size of the aperture 20 or slightly smaller than the aperture. Once the rupture is formed, the vacuum draws out as much of the yolk material as is desired.

It has been found that the aperture 20 should be, for best results in maintaining the integrity of the yolk membrane 16, of a diameter between about 0.006 inch and 0.375 inch. In one preferred embodiment of the invention, the opening 20 has a diameter of about 1/16 inch, that is, about 0.06 inch. It has been found that aperture diameters larger than about 3/8 inch tend to open too large a breach in the yolk membrane 16, and this can cause disintegration of the membrane and running together of the yolk and white material, ruining the appearance and integrity of the egg for preparing certain egg dishes. Conversely, if the aperture 20 is too small, smaller than about 0.006 inch, successful yolk extraction is still possible, but higher degrees of vacuum are required for such a small aperture, to the point of being impractical for a kitchen appliance, and the viscous yolk material is difficult to draw out even if the membrane can be ruptured in this way.

Figure 4:
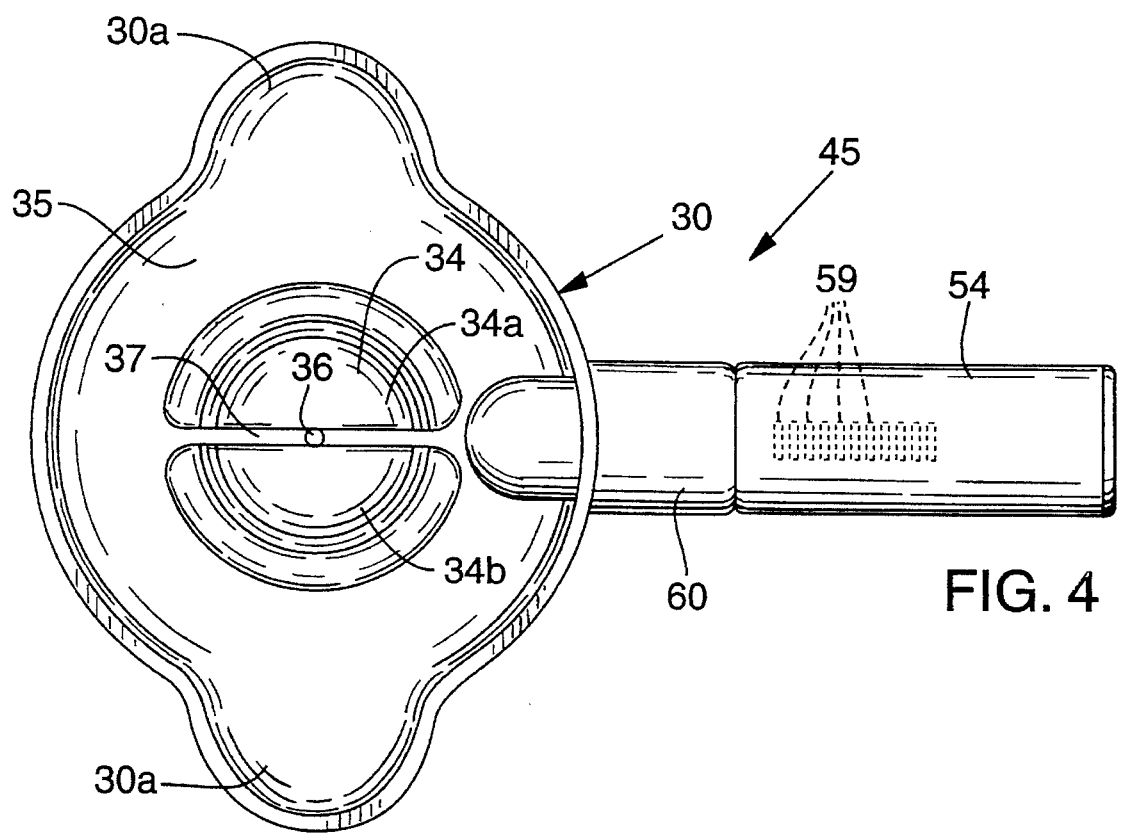
FIG. 4 is a top plan view of the yolk extractor device.
Figure 5:
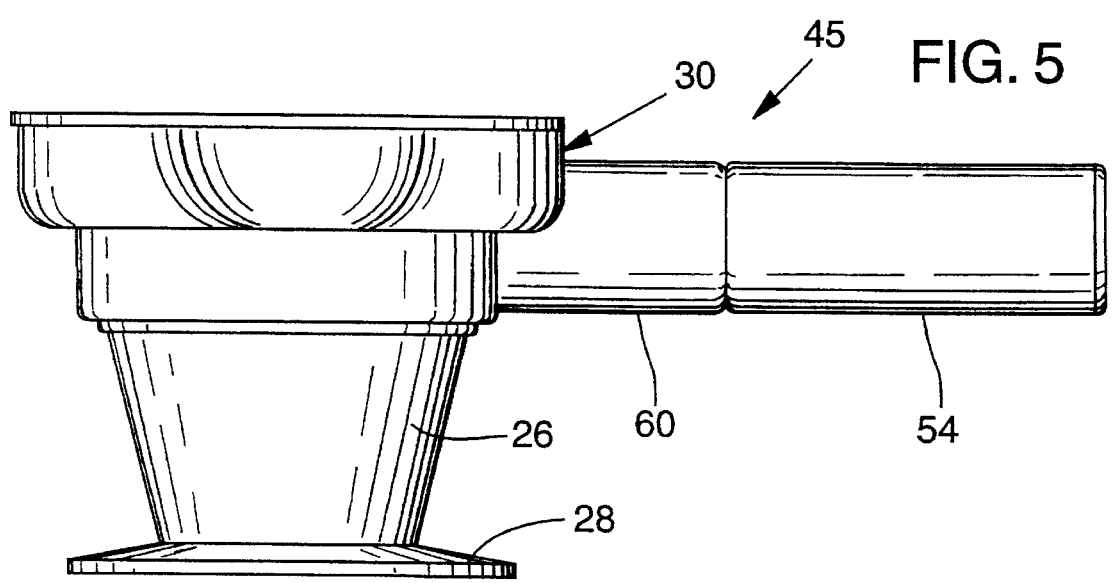
FIG. 5 is a side elevation view showing a portion of the yolk extractor device.
Figure 6:
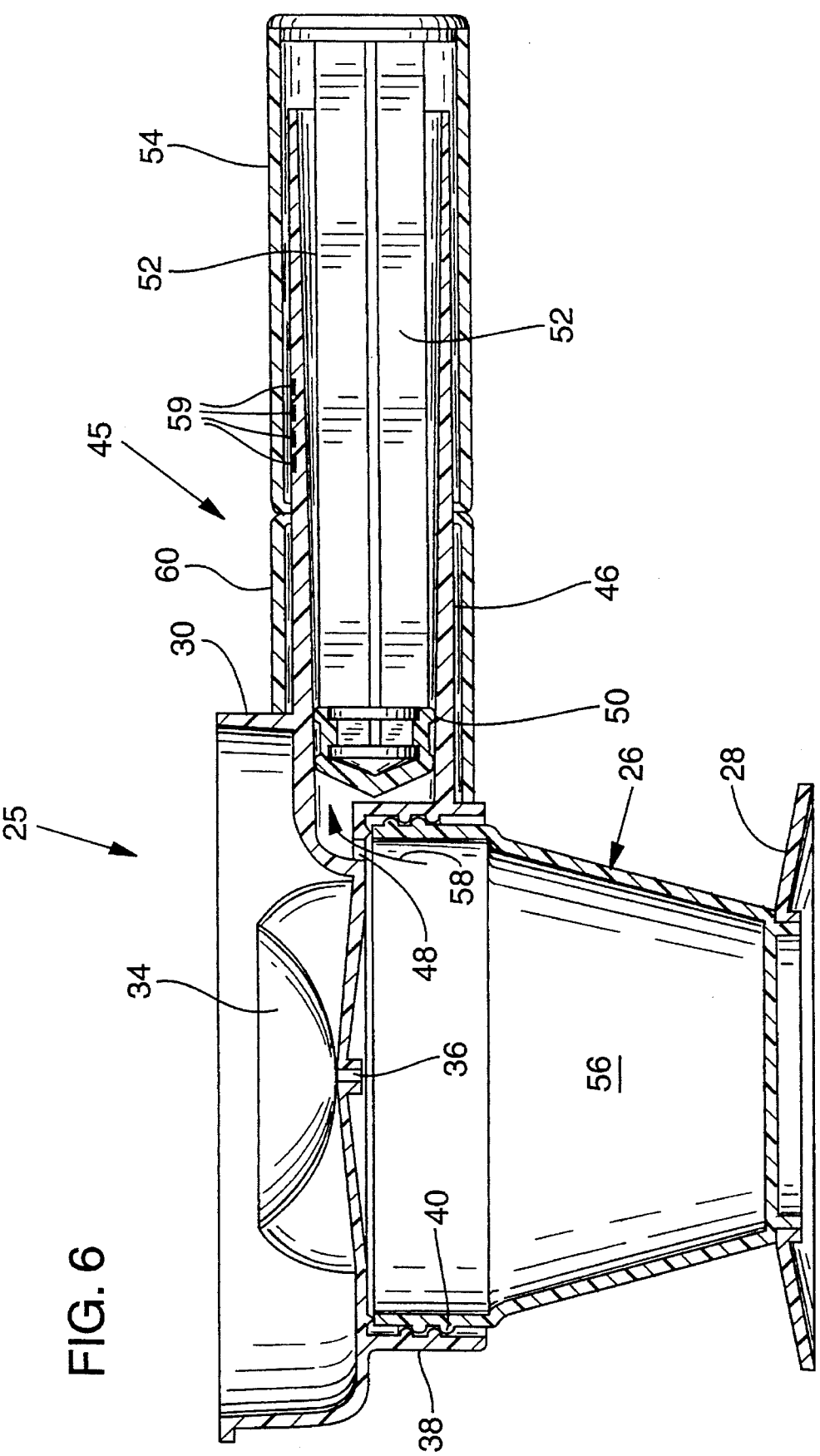
FIG. 6 is a sectional side elevation view showing a portion of the device.

FIGS. 2 through 6 show one example of a preferred embodiment of an egg extractor device 25. In this embodiment the yolk extractor includes a pedestal 26 with a bottom base 28 adapted to rest on a surface such as a kitchen counter top. The pedestal 26 supports an egg receiving tray generally indicated at 30 and having a generally concave or dish-like interior 32 with a central yolk containment area or yolk restraining means 34 for generally confining the yolk to the central area of the tray. The yolk confinement area 34 is surrounded by a white containment area 35, as illustrated. As can be seen in FIGS. 3 and 6, the yolk confining area 34 has an aperture 36 for yolk extraction, corresponding to the aperture 20 shown in the conceptual schematic view of FIG. 1. The yolk confinement area 34 may be divided into two spaced-apart sections 34a and 34b as shown particularly in the plan view of FIG. 4, with a "canyon" space 37 between the sections for allowing the egg white to run out into the area 35. The yolk containment area could be a shallower dish-like continuous round shape, shallow enough to allow the egg white to run over the edges.

It is emphasized that the structure shown in FIGS. 2 through 6, while representing one preferred embodiment, still is only one example of many different shapes and configurations which can be used for holding the freshly cracked whole egg in position for yolk extraction. The central yolk confining area 34 could be more or less flat as in FIG. 1, but with embossings or protrusions in a generally circular or oval pattern for generally confining the yolk to the central area where the aperture 36 is positioned. Even a flat surface such as in the schematic view of FIG. 1 will suffice, but is generally undesirable because the egg 12 will tend to slide away from the yolk-withdrawing aperture if the device is bumped or is not on a truly level surface.

In the device 25 shown in FIGS. 2 through 6, the tray 30 preferably is of a plastic material suitable for contact with foods, such as one of a number of polyethylene or polypropylene formulations. The tray 30 may be clear and essentially transparent, or it can be opaque. The pedestal 26 can be of a similar material, but its makeup is not as important as that of the tray 30.

As illustrated in FIGS. 3 and 6, the tray 30 includes a lower collar 38 extending down from the white-retaining area 35. This collar 38 cooperates with an annular collar 40 of the pedestal section 26 to form a substantially air tight seal between the pedestal 26 and the tray section 30. The two collars may be sized and tapered so that one fits closely within the other, or, as shown in FIG. 3, they may screw together via screw threads, with the air seal made by an annular rim 41 on the tray 30, bearing down against the upper edge of the pedestal collar 40. In lieu of the sealing rim 41, some form of seal is positioned between the two components, so that vacuum can be applied. It can comprise another form of seal such as a gasket (not shown) positioned between the two components where the rim 41 is shown. Alternatively, an O-ring could be used, such as in a gap between the components shown at 42.

FIGS. 5 and 6 show one preferred embodiment of a suction applying device generally indicated at 45, forming a part of the yolk extractor device 25. The suction applying device in this embodiment includes a stem (which may be cylindrical) 46 extending generally horizontally outwardly from the tray portion 30 as shown in FIG. 6. This tubular stem 46, as shown in the drawing, is connected to and may be integrally formed with the tray portion 30, and its interior communicates through an opening 48 with the interior of the pedestal 26. The tubular stem 46 serves as a gas cylinder and has a slidable piston 50 within it. The piston 50 is connected by a stem 52 or other appropriate linkage to an outer sleeve-shaped handle 54 for gripping by the user. As can be seen from FIG. 6, the handle 54 is closely fitted over the tubular stem 46 and guided thereon for sliding movement, so that when the user pulls the handle 54 back, the piston 50 (which is sealed to the interior of the cylinder 46) pulls a vacuum downstream, including in the space 56 defined in the interior of the pedestal 26 and of the tray collar 38 below the yolk retaining dish 34. This produces the desired vacuum acting on the yolk membrane to rupture it very locally, only at the orifice 36 as discussed above relative to the schematic view of FIG. 1. The action of the piston 50 draws air in the direction of the arrow 58 in FIG. 6, while the egg yolk material falls straight down into the interior of the pedestal 26, falling onto the interior of the base portion 28 which is seen in FIG. 3.

When the yolk has been withdrawn to the extent desired, which can be a small amount of yolk or up to about 90% or more of the yolk while still leaving the raw egg intact, the egg can then be poured out of the tray 30 using either of two pouring ends 30a which can be seen in FIGS. 2, 3 and 4. Poured out of the tray, the egg remains intact and will pour onto another surface with the same appearance and integrity, behaving as if the membrane had not been ruptured.

In a preferred embodiment of the invention, the yolk extractor device 25 allows a user to withdraw a metered quantity of the yolk from the egg, so that the user is able to reduce the quantity of fat and cholesterol in the egg by a known, desired amount or percentage. For this purpose, some form of quantity markings, schematically indicated at 59 in FIG. 6 and also shown in dashed lines in FIG. 4, give a visual indication to the user as to what quantity of the egg's yolk has been removed as the user pulls the piston handle 54 back farther along the tubular stem 46. As can be appreciated, these markings 59 can show approximate egg yolk quantity withdrawn, in milliliters, for example, and in addition (or in the alternative), these markings can show approximate percentages of the yolk removed, based on an average hen's egg yolk volume. In this way the user of the extractor device can intentionally withdraw a planned amount or percentage of the yolk, thereby achieving a desired reduction in the amount of fat and cholesterol which will be consumed.

It can be seen that cleaning of the yolk extractor device is easily facilitated by separation of the pedestal 26 from the tray section 30. Extracted yolk material is easily washed out of the interior of the pedestal 26, and the tray also is easily washed, the piston and cylinder 50, 46 not being affected by the operation.

FIG. 6 shows another sleeve 60 positioned on the exterior of the hollow stem 46, adjacent to the tray 30. This is also seen in FIGS. 4 and 5. This sleeve 60 helps define the limit inward position of the piston 50, as well as providing an even outer surface on the assembled suction device 45.

Although the preferred embodiments above show the yolk extractor orifice located in a surface beneath the egg yolk on which the egg rests, it could be located elsewhere. The primary principle of the invention is that a surface be pressed against the yolk membrane, with a light pressure generally on the order of the pressure which the yolk itself exerts on a flat surface. An orifice or aperture in this surface, whether the surface is below the egg yolk or above it or obliquely approaching from one side, is effective to permit withdrawing of yolk material by suction through the hole, fracturing the membrane very locally. Continued light pressure against the membrane, at least in the area immediately surrounding the orifice, facilitates withdrawal of the yolk material and maintenance of the membrane's structure to the extent that the membrane does not disintegrate after the yolk withdrawing operation is completed.

Figure 7:
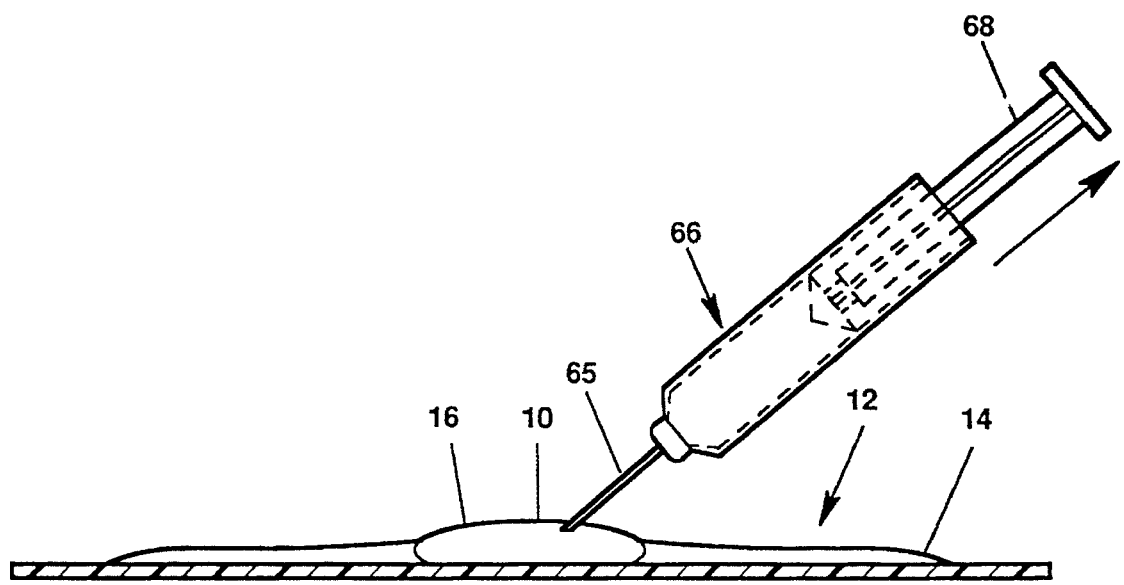
FIG. 7 is a schematic view in elevational section showing extraction of egg yolk using a hypodermic type needle.

Even without the pressing surface surrounding the orifice, good results have still been obtained provided the orifice is sufficiently small. For example, withdrawal of most of the yolk of a raw egg, up to about 80% to 90%, has been successfully achieved using a hypodermic needle which punctures the yolk membrane from above, provided care was used to maintain the needle very steady to avoid tearing of the membrane. This is schematically indicated in FIG. 7. These results suggest that so long as a very neat, regular and orderly hole is produced through the membrane, sufficiently small, the membrane will not disintegrate during yolk removal or after completion of yolk removal. As shown in FIG. 7, the yolk 10 of an egg 12 is being withdrawn by a hypodermic-type needle 65, which has pierced the membrane 16 at any location which is convenient, generally at the upper side of the yolk. The needle 65 is secured to a hypodermic-type liquid withdrawing assembly 66, the handle 68 of which is pulled back to draw liquid material through the needle 65 and into the assembly 66.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for preparing a hen's egg for human consumption including reducing the egg's cholesterol content by extracting a portion of the yolk of the egg without destroying the membrane or division between the yolk and white of the egg, comprising:

opening a fresh said hen's egg intended for human consumption, removing the shell from the egg and placing the egg yolk and white together on an egg-supporting surface with the yolk membrane of the egg intact, providing a suction device with a small aperture, rupturing the yolk membrane using the suction device and applying suction via the suction device, through the aperture, to draw out most of the volume of the yolk and reduce the chloesterol content of the egg, in such a way as not to cause disintegration of the membrane, removing the suction device so as to allow the egg membrane to remain substantially intact and maintaining the separation between the yolk and the white of the egg, and transferring the egg white and yolk, with the substantially intact membrane and with separation maintained between the yolk and white, to a cooking utensil for cooking.

2. A method for preparing a hen's egg for human consumption by extracting a portion of the yolk of the egg without destroying the division between the yolk and white of the egg, comprising:

opening a fresh said hen's egg intended for human consumption, removing the shell from the egg and placing the egg yolk and white together on an egg-support surface with the yolk membrane of the egg intact, providing a suction device with a small aperture, rupturing the yolk membrane using the suction device, by placing the suction device against the yolk membrane with slight pressure, without piercing the yolk membrane with the device, then applying suction to open the yolk membrane only at a small area essentially the size of the aperture, sufficiently small so as not to cause disintegration of the membrane, and drawing out a desired volume of the yolk, and removing the suction device so as to allow the egg membrane to remain substantially intact and maintaining the separation between the yolk and the white of the egg.

3. The method of claim 1, wherein the suction device is a hypodermic-type suction device with a needle, and the step of rupturing the yolk membrane comprises puncturing the yolk membrane with the needle and inserting the end of the needle into the yolk, then drawing out the desired volume of yolk with the hypodermic-type suction device, through the needle, while taking care not to move the needle laterally, avoiding tearing of the membrane.

4. The method of claim 2, wherein the suction device includes said egg-supporting surface, with said aperture being an opening in the egg-supporting surface connected to a source of suction, the step of placing the suction device against the yolk membrane with slight pressure comprising placing the egg yolk and white on the supporting surface such that the yolk is directly over the aperture.

5. The method of claim 4, further including, following the drawing out of the desired volume of the yolk, transferring the egg white and yolk, with the substantially intact membrane and with separation maintained between the yolk and white, to a cooking utensil for cooking.

* * * * *